(12) United States Patent
Kasper et al.

(10) Patent No.: US 8,974,136 B2
(45) Date of Patent: Mar. 10, 2015

(54) CONNECTION ARRANGEMENT AND CROSSMEMBER

(71) Applicant: PROGRESS-WERK Oberkirch AG, Oberkirch (DE)

(72) Inventors: Stephan Kasper, Oberkirch (DE); Franz Mayer, Oberkirch (DE); Arnaud Offner, Soufflenheim (FR); Hansjoerg Schmieder, Oberkirch-Zusenhofen (DE); Daniel Vogel, Kappelrodeck (DE)

(73) Assignee: PROGRESS-WERK Oberkirch AG, Oberkirch (DE)

( * ) Notice: Subject to any disclaimer, the term of this patent is extended or adjusted under 35 U.S.C. 154(b) by 0 days.

(21) Appl. No.: 13/968,410

(22) Filed: Aug. 15, 2013

(65) Prior Publication Data

US 2014/0049075 A1    Feb. 20, 2014

(30) Foreign Application Priority Data

Aug. 17, 2012  (DE) .......................... 10 2012 016 268

(51) Int. Cl.
| | |
|---|---|
| *B62D 27/02* | (2006.01) |
| *B62D 25/00* | (2006.01) |
| *B62D 21/02* | (2006.01) |
| *B62D 25/14* | (2006.01) |

(52) U.S. Cl.
CPC ............... *B62D 27/02* (2013.01); *B62D 21/02* (2013.01); *B62D 25/145* (2013.01)
USPC ......... 403/300; 296/193.02; 296/29; 296/205

(58) Field of Classification Search
USPC .................... 403/270–272, 300; 296/205, 29; 285/406
See application file for complete search history.

(56) References Cited

U.S. PATENT DOCUMENTS

| 6,450,533 | B1 | 9/2002 | Kimura et al. |
| 6,979,025 | B2 * | 12/2005 | Conder et al. ................. 285/55 |
| 7,513,538 | B1 * | 4/2009 | Gee ................................ 285/406 |
| 2005/0263568 | A1 * | 12/2005 | Stol .............................. 228/107 |
| 2014/0103685 | A1 * | 4/2014 | Mani ......................... 296/193.02 |

FOREIGN PATENT DOCUMENTS

| DE | 19738830 A1 | 3/1999 |
| DE | 10040824 A1 | 3/2001 |
| DE | 10121402 A1 | 11/2002 |
| DE | 10240395 A1 | 3/2004 |
| EP | 2112054 A1 | 10/2009 |
| WO | 2008034522 A1 | 3/2008 |

* cited by examiner

*Primary Examiner* — Dennis H Pedder
(74) *Attorney, Agent, or Firm* — Reising Ethington P.C.

(57) ABSTRACT

A connection arrangement for connecting two tube pieces of a crossmember for a vehicle has a first attachment element made of a first material, wherein the first attachment element is provided for a solid material-bonded connection to at least a first tube piece which comprises the first material. Furthermore, the first attachment element has a second attachment element which is fastened to the first attachment element, wherein the second attachment element consists essentially of a second material differing from the first material, wherein the second attachment element is provided for a solid material-bonded connection to a second tube piece which comprises the second material. Furthermore, a crossmember has such a connection arrangement.

11 Claims, 4 Drawing Sheets

CONNECTION ARRANGEMENT AND CROSSMEMBER

CROSSREFERENCE TO RELATED APPLICATION

This application claims priority from German patent application No. 10 2012 016 268.5 filed on Aug. 17, 2012. The entire content of this priority application is incorporated herein by reference.

BACKGROUND OF THE INVENTION

The invention relates to connection arrangements for connecting two tube pieces of a crossmember for a vehicle. Further, the invention relates to crossmembers for vehicles having such a connection arrangement.

From the document WO 2008/034522 A1, a connection arrangement is known which has an attachment element in the form of a socket, which consists universally of the same material and at the longitudinal ends of which tube pieces are inserted, these being adhesively bonded to the socket in order to thus produce the crossmember.

The connection arrangement according to the invention and the crossmember according to the invention can be used, in particular as a component of a motor vehicle body, without loss of generality. As part of the motor vehicle body, the crossmember is arranged between what are known as the A-pillars in the region underneath the windscreen, running approximately horizontally. The crossmember serves for fastening the dashboard, the crossmember additionally stiffening the dashboard, which usually consists of plastic.

The crossmember has to have a high flexural rigidity, not only owing to its function of bracing the dashboard, but also on account of its function as a vehicle body component. A high flexural rigidity of the crossmember contributes not only ultimately to an increased safety of the motor vehicle and to protection of the occupants in the event of an accident. On the other hand, it is desirable nowadays to save weight in the case of body components in order to lower the energy consumption of motor vehicles.

Crossmembers are occasionally made up of at least two tube pieces which have to be solidly connected to one another. In order to take into account the demand for the highest possible stability and torsional and flexural rigidity, on the one hand, and the lowest possible weight, on the other hand, different materials of differing density are occasionally used for the various tube pieces.

In order to take into account the needs for the lowest possible weight, and without a loss in stability, the tube piece running in the region of the steering column can be produced from steel, whereas the crossmember on the passenger side can have a lighter tube piece made from a light metal, in particular made of aluminum, with both tube pieces being fixedly connected to one another.

Within the context of the present invention, the term "tube" or "tube piece" is to be understood in general terms, it being possible within the context of the present invention for these to have any desired cross-sectional shape, which may be round, angular or oval, for example. Similarly encompassed is a configuration of a tube piece which is open laterally in cross section, for example in a C, T or L shape and the like.

The crossmember disclosed in document WO 2008/034522 is based on the concept of solidly connecting the individual tube pieces, which typically consist of different materials, in particular of light metals or composite materials, by means of a respective socket arranged between two tube pieces and by an adhesive connection between the socket and the tubes. The socket is in this case in the form of a single-part magnesium die-cast component.

A connection between the socket and the tube pieces by adhesive bonding is, however, less suitable for large-scale or mass production of crossmembers owing to the time and cost involved in this connection technique. In addition, this connection technique has the disadvantage that material-bonding joining processes common for tube pieces consisting of metal, in particular steel tubes or aluminum tubes, for example welding processes, and the associated cost-effective production processes cannot be used for the production of crossmembers. This is because it is not readily possible to simply weld tube pieces made of steel and aluminum to the socket made of diecast magnesium. This is disadvantageous with respect to the production costs for a crossmember.

Document EP 2 112 054 A1 discloses a crossmember having a crossmember tube piece made of steel on the driver side and a crossmember tube piece made of aluminum on the passenger side, the two crossmember tube pieces being welded to one another directly by means of a CMT welded connection.

The connection of the crossmember parts made of steel and aluminum by a CMT welded connection is disadvantageous since this is complicated and expensive. In addition, a material-bonded welded connection between aluminum and steel is to be considered sceptically in terms of the stability of the crossmember.

SUMMARY OF THE INVENTION

It is an object of the present invention to provide a connection arrangement that can be produced in a time and costs saving manner.

It is a further object of the present invention to provide a connection arrangement which can be manufactured using common material-bonding joining processes which are established for metals.

It is a further object to provide a crossmember that can be produced in a time and costs saving manner.

It is a further object of the present invention to provide a crossmember which can be manufactured using common material-bonding joining processes which are established for metals.

According to an aspect, a connection arrangement for connecting two tube pieces of a crossmember for a vehicle is provided, comprising a first tube having a first material, a first attachment element essentially made of the first material and arranged to be solidly connected to the first tube piece in material-bonded manner, a second tube having a second material different from the first material, a second attachment element essentially made of the second material and fastened to the first attachment element, the second attachment element arranged to be solidly connected to the second tube piece in material-bonded manner.

According to a further aspect, a crossmember for a vehicle is provided, comprising a first tube having a first material, a first attachment element essentially made of the first material and solidly connected to the first tube piece in material-bonded manner, a second tube having a second material different from the first material; a second attachment element essentially made of the second material and fastened to the first attachment element, the second attachment element being solidly connected to the second tube piece in material-bonded manner.

The connection arrangement according to the invention has a first attachment element and a second attachment element which are fastened to one another. The first attachment element consists essentially of a first material and the second attachment element consists essentially of a second material. The second material differs from the first material. The connection arrangement is arranged between two tube pieces, the first attachment element being connected to the first tube piece in material-bonded manner and the second attachment element being connected to the second tube piece in material-bonded manner. Here, "consisting essentially of the first material" or "consisting essentially of the second material" is to be understood as meaning that the first attachment element and the second attachment element consist of the first or, respectively, second material at least in their joint region of the material-bonded connection to the first or, respectively, second tube piece. However, the attachment elements can also consist entirely of the respective material.

With the connection arrangement according to the invention, it is now advantageously possible to connect the first attachment element to the first tube piece in material-bonded and mono-material or sorted manner and to connect the second attachment element to the second tube piece in material-bonded and mono-material or sorted manner. If, for example, the intention is to connect a tube piece made of aluminum to a tube piece made of steel, aluminum is chosen for the first attachment element and steel is chosen for the second attachment element, such that aluminum is to be connected with aluminum in material-bonded manner and steel is to be connected to steel in material-bonded manner, for which purpose common welding processes which are readily controllable can be employed. The crossmember according to the invention can therefore be produced cost-effectively and involving little time.

The two attachment elements can be formed from solid material or else can be hollow, the geometry of the attachment elements being adapted to the geometry of the tube pieces to be connected. The material-bonded connection between the attachment elements and the tube pieces can be realized edge to edge or with an overlap.

The connection of the first attachment element to the second attachment element and the material-bonded connection of the first attachment element to the first tube piece and of the second attachment element to the second tube piece additionally ensure that the crossmember has a high flexural rigidity in the region in which the two tube pieces are connected.

In addition, the connection arrangement according to the invention can be introduced into the production process of a crossmember as a prefabricated part. The connection arrangement according to the invention is suitable specifically for being produced temporally and locally independently of the final production of the crossmember, which additionally contributes to a reduction in the time and costs involved in the production of the entire crossmember. The connection arrangement according to the invention can have a small size and can be shipped in large quantities with a smell shipping volume to the site of final production of the crossmembers, as a result of which shipping costs are kept low.

The advantages of the crossmember according to the invention for a vehicle become apparent from the aforementioned advantages of the connection arrangement, since the latter is suitable in particular for the production of a crossmember.

In a preferred configuration of the connection arrangement, the first attachment element and the second attachment element are arranged in succession aligned in the longitudinal direction.

This configuration is advantageously suitable for an aligned connection of two tube pieces. Owing to an aligned arrangement of the first tube piece and of the second tube piece and also of the first attachment element and of the second attachment element, the tube pieces can be connected without an overlapping region of the tube pieces on account of the interposed connection arrangement, which contributes to a reduction in the use of material and therefore to a reduction in costs.

In a further preferred configuration, the first attachment element and the second attachment element are tubular.

Compared to a configuration of full material, a tubular configuration of the first and second attachment elements achieves the advantage of a saving in weight of the connection arrangement. In addition, the tube pieces to be connected can be pushed into the attachment elements and can therefore be connected to the attachment elements in material-bonded manner with an overlap, as a result of which the stability of the material-bonded connection can be increased.

In a further preferred configuration, the first attachment element and the second attachment element have different wall thicknesses.

By way of example, the attachment element made of the relatively hard material, for example of steel, can be produced with a smaller wall thickness than the attachment element made of the relatively soft material, for example aluminum, such that this measure likewise advantageously contributes to a saving in weight, without this being accompanied by a loss in stability.

In a further preferred configuration, the first attachment element and the second attachment element have different cross sections, in particular cross-sectional profiles or cross-sectional diameters.

In this configuration, tube pieces having different cross-sectional diameters or cross-sectional profiles can advantageously be connected to one another. Crossmembers in the manufacture of vehicle bodies often have portions with different cross-sectional profiles or cross-sectional diameters over the length of the crossmember, in order to rule out resonances in the crossmember during operation of the vehicle.

In a further preferred configuration, the first attachment element and the second attachment element are connected to one another in a form-fitting manner.

One advantage of this configuration is that the different materials of the first attachment element or of the second attachment element play a subordinate role for the connection of said elements to one another, since material—bonded fastening of the attachment elements to one another can be dispensed with in this configuration. By way of example, a form-fitting connection of the attachment elements can be realized by screwing or screwing means.

In a further preferred configuration of the connection arrangement, the first attachment element and the second attachment element are connected to one another by a screwed connection.

A screwed connection represents on the one hand a stable connection technique and on the other hand a connection technique which is easy to handle in terms of assembling the connection arrangement, this connection technique also making it possible to compensate for tolerances.

In a preferred embodiment, the screwed connection has a screw element and a locking element, wherein the screw element extends in the interior of the first attachment element and of the second attachment element and is held against an inner face of a first end wall of the first attachment element, wherein the locking element is held against an inner face of a second end wall of the second attachment element lying opposite to the first end wall of the first attachment element, and is screwed to the screw element.

This embodiment constitutes a particularly simple and cost-effective form-fitting and also force-fitting connection between the first attachment element and the second attachment element which has both a very high compressive and tensile strength in the longitudinal direction of the connection arrangement and also a high flexural rigidity transverse to the longitudinal direction. With this configuration of the connection arrangement, it is additionally possible in a particularly simple manner, if the distance between the ends of the tube pieces which m to be bridged by the connection arrangement is subjected to tolerances, to compensate for such tolerances by spacer washers introduced between the first and the second attachment elements.

A further advantage of this embodiment is that the screwed connection arranged in the interior of the, in this case hollow, attachment elements is protected to the greatest possible extent against external influences.

In a further preferred configuration, a partition element for avoiding contact corrosion between the first attachment element and the second attachment element is arranged between the first attachment element and the second attachment element.

This measure advantageously increases the long-term stability of the connection arrangement by avoiding contact corrosion between the two attachment elements. The use of a partition element for avoiding contact corrosion is advantageous particularly when the first attachment element and the second attachment element consist of different metals with different electrochemical properties, for example in the case of steel and aluminum. A partition element of this type can be a galvanic coating or a part which is inert towards the materials of the attachment elements.

In a further preferred configuration, the first attachment element is inserted partially into the second attachment element, such that the first attachment element and the second attachment element peripherally touch one another in an overlapping manner over a partial length of the first attachment element and of the second attachment element, wherein the first attachment element and the second attachment element are fastened to one another in the overlap region by forming, in particular by crimping or flanging.

This embodiment, too, constitutes a form-fitting connection of the two attachment elements to one another. One advantage of this configuration is that the connection between the first attachment element and the second attachment element by means of forming, in particular cold forming, is a very simple connection which can be produced cost-effectively. In addition, since the first attachment element is inserted partially into the second attachment element along the second partial length, an increased flexural rigidity is achieved transversely to the longitudinal direction of the connection arrangement, since the attachment elements are supported against one another transversely to the longitudinal direction.

In a further preferred configuration of the aforementioned measure, the first attachment element has an overlap region for receiving the first tube piece in an overlapping manner along a partial length of the first attachment element and for connecting the first attachment element to the first tube piece in material-bonded manner.

Owing to the overlapping reception of the first tube piece on the first attachment element preferably over the entire periphery, the inner face of the first tube piece and the outer face of the first attachment element touch one another in the first overlap region, advantageously resulting in a high flexural rigidity of the connection of the tube piece with the connection arrangement transversely to the longitudinal direction.

In a further preferred alternative configuration, the first attachment element and the second attachment element are connected to one another in material-bonded manner.

One advantage of this configuration is that the first attachment element and the second attachment element are connected to one another in particular with a high torsional rigidity. By way of example, if the first attachment element is made of aluminum and the second attachment element is made of steel, the two attachment elements can be connected by a material-bonded join, for example an EMPT join.

In a further preferred configuration, the first attachment element and the second attachment element are connected to one another by a strip-shaped or sleeve-shaped connection element, which surrounds the first attachment element and the second attachment element at least partially peripherally.

The fastening of the two attachment elements by means of a strip-shaped or sleeve-shaped connection element likewise constitutes a particularly simple and cost-effective type of fastening.

In the case of a strip-shaped connection element, this can be produced from a composite material, in particular a glass fibre composite material (GRP) or a carbon fibre composite material (GRP). The strip-shaped connection element is preferably wound around the attachment elements in a plurality of layers. It can be self-adhesive or can be bonded to the attachment elements by separate adhesive.

A sleeve-shaped connection element can be, for example, a metal sleeve which is preferably adhesively bonded onto the attachment elements.

The choice of a suitable overlap region between the strip-shaped or sleeve-shaped connection element and the first attachment element and also the second attachment element makes if possible to adapt the flexural rigidity of the connection arrangement to the respective requirements of the cross-member. In addition, a connection of the attachment elements, which in the present case consist of different metals, to a strip-shaped connection element made of a non-metal is non-critical in terms of contact corrosion. This also applies to the configuration of the connection element in the form of a metallic sleeve, if the latter is adhesively bonded onto the attachment elements by means of a layer of adhesive such that there is no contact between the sleeve and the attachment elements.

In addition, the fastening of the first attachment element to the second attachment element by the strip-shaped or by the sleeve-shaped connection element gives rise to the advantage that these connection elements are also suitable for being able to compensate for large tolerances in the distance between the first tube piece and the second tube piece, because the attachment elements can be fastened to one another spaced apart differently.

In the case of a sleeve-shaped connection element, the latter preferably has at least one partition line, which runs in the longitudinal direction of the connection element and interrupts the sleeve-shaped connection element in its peripheral extent.

The at least one partition line firstly makes it possible to easily adapt the sleeve to the attachment elements in terms of diameter by expanding or compressing, and secondly the partition line can be utilized as an adhesive gap advantageously for introducing adhesive between the sleeve and the attachment elements. The partition line can tee continuous or interrupted in the longitudinal direction of the sleeve.

In a further configuration of the aforementioned alternative configurations, the first attachment element, the second attachment element and the strip-shaped or sleeve-shaped connection element are connected to one another in material-bonded manner through at least one adhesive connection.

An adhesive connection between the first attachment element, the second attachment element and the strip-shaped or sleeve-shaped connection element is easy to implement end can advantageously contribute to the avoidance of contact corrosion.

However, it is similarly possible, as provided in an alternative configuration to that mentioned above, that the second attachment element and the sleeve-shaped connection element are connected to one another in material-bonded manner through at least one welded connection, in particular a CMT welded connection.

A material-bonded connection of the first attachment element, of the second attachment element and of the sleeve-shaped connection element by a CMT welded connection constitutes a possible connection technique.

In general terms, the advantages for the crossmember according to the invention become evident from the advantages of the connection arrangement according to the invention in one or more of the aforementioned configurations. Preferably, the first tube piece of the crossmember is formed as a steel tube and the second tube piece of the crossmember is formed as a light metal tube, in particular as an aluminum tube, where in this case the first attachment element is produced from steel and the second attachment element is produced from light metal, in particular aluminum.

By choosing substantially the same material for the first attachment element and the first tube piece and also for the second attachment element and the second tube piece, it is possible to ensure that the first tube piece can be welded to the first attachment element and the second tube piece can be welded to the second attachment element in a mono-material or sorted manner, leading to an increased quality of the joint between the connection arrangement and the tube pieces. In addition, for connecting the first attachment element to the first tube piece and the second attachment element to the second tube piece, it is possible to draw on already existing and established processes for connecting crossmember components, which makes simple and cost-effective production of the crossmember possible.

The connection arrangement according to the invention in the embodiments described above additionally makes tolerance compensation possible, in that the compensation of gaps in the longitudinal direction and also transversely thereto can be ensured by an appropriate configuration of the connection arrangement in respect of the cross-sectional profile, the cross-sectional diameter and/or toe connection between the attachment elements.

On account of the fact that the connection arrangement can be prefabricated as a separate part which is welded to the first and the second tube pieces during the final production of the crossmember, in principle the individual production processes of the crossmember can be locally and temporally decoupled, which on the one hand results in a reduction in the time and costs involved and on the other hand makes it possible to flexibly adapt fluctuations in quantities or models which possibly arise within existing processes.

Further advantages and features will become apparent from the following description and the accompanying drawing.

It is self-evident that the features mentioned above and those still to be explained below can be used not only in the combination given in each case, but rather also in other combinations or on their own, without departing from the scope of the present invention.

BRIEF DESCRIPTION OF THE DRAWINGS

Exemplary embodiments of the invention are shown in the drawings and will be described in more detail with reference thereto. In the drawings.

DESCRIPTION OF PREFERRED EXEMPLARY EMBODIMENTS

Figure 1:
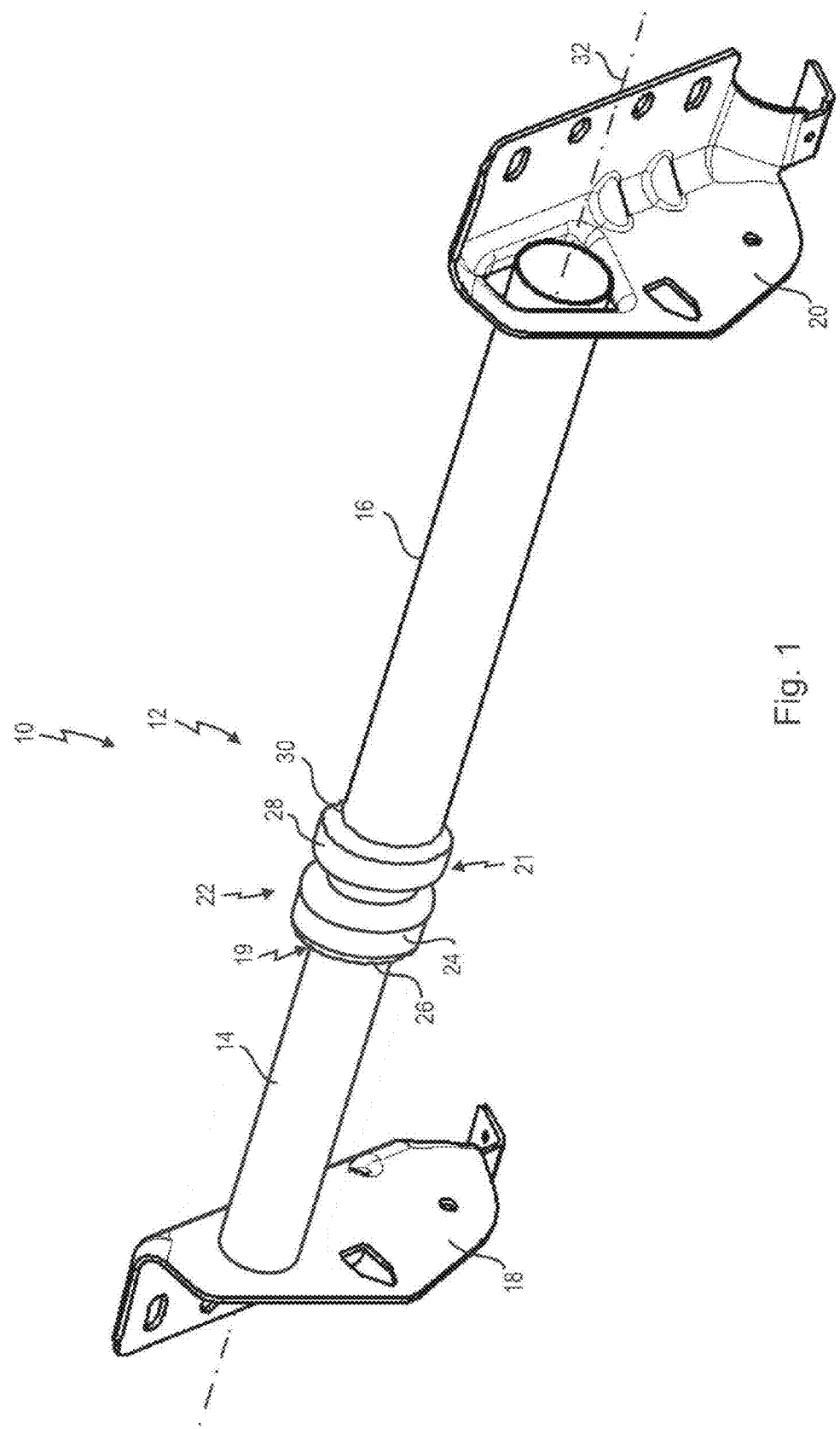
FIG. 1 shows a crossmember, having a tube arrangement which has a first tube piece and a second tube piece and also a connection arrangement arranged therebetween for connecting the two tube pieces, in a perspective illustration.

FIG. 1 shows a crossmember provided with the general reference sign 10, for a motor vehicle. The crossmember 10 is used in a motor vehicle for bracing a dashboard (not shown). The crossmember 10 is arranged in a motor vehicle in the region underneath the windscreen between the vertically running A-pillars and is fastened to the latter.

The crossmember 10 has a tube arrangement 12 having a first tube piece 14 and a second tube piece 16.

The first tube piece 14 and the second tube piece 16 have a circular cross section in the exemplary embodiment shown. It is self-evident that the first tube piece 14 and the second tube piece 16 can also have cross-sectional profiles which differ from a circular cross section. In the exemplary embodiment shown, the first tube piece 14 has a smaller cross-sectional diameter than the second tube piece 16, it being possible for the tube piece 16 to have a greater wall thickness than the first tube piece 14. It is self-evident that the cross-sectional diameter and/or the wall thickness of the tube pieces 14 and 16 can have any desired feasible dimensions. It is similarly self-evident that the tube pieces 14 and/or 16 can also have one or more bends or a curved profile instead of being straight, as is shown.

At its two ends, the crossmember 10 has a first fastening element 18 and a second fastening element 20 for attaching the crossmember 10 to the two A-pillars (not shown).

When installed in a motor vehicle, the first fastening element 18 forms the left-hand end of the crossmember 10, as seen from the driver, and the second fastening element 20 forms the right-hand end of the crossmember 10.

At ends 19, 21 remote from the fastening elements 18 and 20, the first tube piece 14 and the second tube piece 16 are connected to one another solidly, in particular with flexural and torsional rigidity, by a connection arrangement 22.

Figure 2:
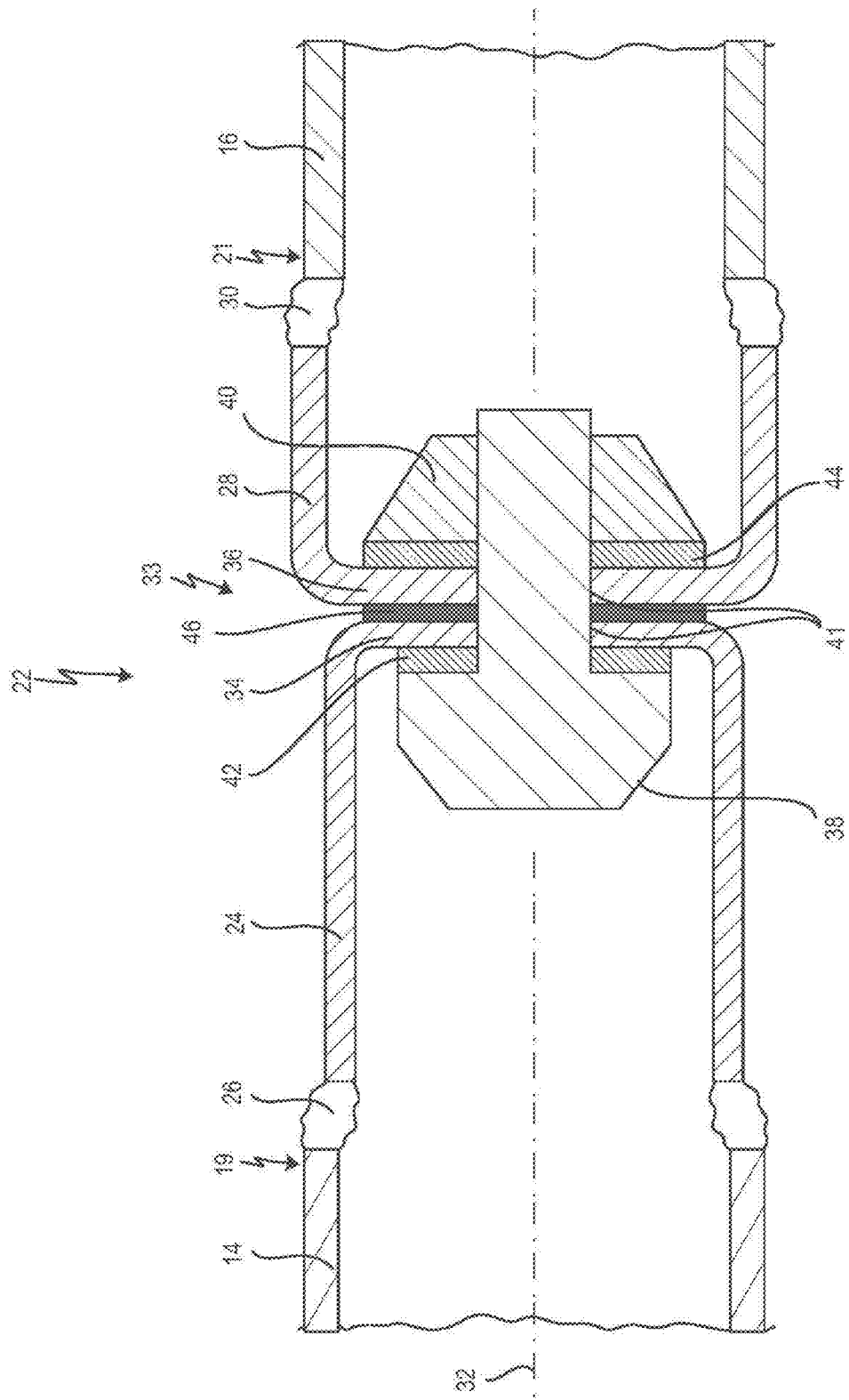
FIG. 2 shows a sectional illustration of the connection arrangement shown in FIG. 1 in a view enlarged compared to FIG. 1.

In the exemplary embodiment shown in FIG. 1 and FIG. 2, the connection arrangement 22 has a first tubular attachment element 24, which is connected in material-bonded manner to the end 19 of the first tube piece 14 by a welded connection 26 formed over the entire periphery. Both the first attachment element 24 and the first tube piece 14 are in this case produced from steel, so that these are welded to one another in a mono-material or sorted manner.

The connection arrangement 22 also has a second tubular attachment element 28, which lies opposite to the first attachment element 24 and is connected to the end 21 of the second tube piece 16 by a second welded connection 30, which is formed over the entire periphery of the second tube piece 16 and of the second attachment element 28. In the present case, the second attachment element 28 and the second tube piece 16 are likewise produced from the same material, in particular from aluminum, so that these are welded to one another in a mono-material or sorted manner. It is self-evident that the attachment elements 24, 28 and the tube pieces 14, 16 can also consist of a steel alloy or of a light metal alloy, in particular of an aluminum alloy.

The first tube piece 14, the second tube piece 16 and also the first and second attachment elements 24, 28 are arranged in succession along a longitudinal axis 32 of the crossmember 10. It is self-evident that, on account of this arrangement, the longitudinal axis of the first attachment element 24 corresponds substantially to the longitudinal axis 32 of the crossmember 10.

In the exemplary embodiment shown in FIG. 1 and FIG. 2, the first attachment element 24 is connected to the second attachment element 28 solidly, in particular with a form fit or force fit, by a screwed connection 33 (cf. FIG. 2).

The connection between the first and second attachment elements 24, 28 and also the attachment thereof to the first and second tube pieces 14, 16 will be described in more detail hereinbelow.

FIG. 2 shows a sectional illustration of the connection arrangement 22 shown in FIG. 1 in an illustration enlarged compared to FIG. 1, and also the attachment of the first attachment element 24 and of the second attachment element 28 of the connection arrangement 22 to the first and second tube pieces 14, 16 of the crossmember by the welded connections 26, 30 formed over the entire periphery.

In the present exemplary embodiment, the second attachment element 28 is designed with an enlarged wall thickness and with an enlarged cross section compared to the first attachment element 24, in order to achieve a stability comparable to the first attachment element 24 consisting of steel.

The first attachment element 24 has a first end wall 34 and the second attachment element 28 has a second end wall 36, these walls being arranged lying opposite one another and being connected by the screwed connection 33, which has a screw element 38 and a locking element 40. The screw element 38 is screwed to the locking element 40, the screw element 38 and the locking element 40 being held in each case against the inner face of the first and, respectively, second end walls 34, 36. The first and the second end walls 34, 36 have through holes 41, which are flush with one another along the longitudinal axis 32 and through, which the screw element 38 extends. The end walls 34, 36 can in this case be formed on the attachment elements 24, 28 by deep drawing or can be joined as separate parts thereto, for example by welding.

It is self-evident that the screwed connection 33 between the first and second attachment elements 24, 28 can also be formed by a threaded bolt, which is screwed with a respective locking element onto the inner faces of the end walls 34, 36. The connection by a bolt which is fixed to one of the end walls 34, 36 and is fastened with a locking element fixed to the opposite inner face of one of the end walls 34, 36 also represents a possible embodiment of a screwed connection.

Washers 42, 44 are additionally introduced between the screw element 38 and the first end wall 34 and also between the second end wall 36 and the locking element 40. These washers serve to prevent contact corrosion between the screw element 38 and the first attachment element 24 and also between the locking element 40 and the second attachment element 28.

A partition element 46, through which the screw element 38 likewise engages, is provided between the first attachment element 24 and the second attachment element 28. Here, the partition element 46 likewise serves for avoiding contact corrosion or mechanical decoupling between the first attachment element 24 and the second attachment element 28. In addition, one such partition element or a plurality of such partition elements can be used to set the length of the connection arrangement 22, for example for tolerance compensation when assembling the crossmember 10. It is self-evident that the material of the spacer washers 42, 44 and also of the partition element 46 can be matched to the materials used in each case for the first and second attachment elements 24, 28 with a view to avoiding contact corrosion.

The first attachment element 24 is connected to the second attachment element 28 fixedly in terms of tensile and compressive loading in the direction of the longitudinal axis 32 and also with flexural rigidity transverse to the longitudinal axis 32 by the screwed connection consisting of the screw element 38 and the locking element 40. The same also applies to the first and second tube pieces 14, 16 of the crossmember 10, which are fastened respectively by the first and second welded connections 28, 30 to the first attachment element 24 and to the second attachment element 28.

The attachment elements 24, 28 are arranged along the longitudinal axis 32 axially flush respectively with one another and with the first and second tube pieces 14, 16. If is self-evident, however, that one of the attachment elements 24, 28 can also be offset in relation to the longitudinal axis 32 and is fixedly connected to the respective other attachment element by the screw element 38 and the locking element 40.

In principle, the cross sections of the substantially tubular first and second attachment elements 24, 28 are matched to the cross sections of the first and second tube pieces 14, 16 of the crossmember 10 in such a manner that these can be solidly connected with the welded connections 26, 30. In the present case, the cross section and the wall thickness of the first attachment element 24 correspond approximately to those of the first tube piece 14 and the wall thickness and the cross section of the second attachment element 28 correspond approximately to those of the second tube piece 16. It is self-evident that the cross sections of the attachment elements 24, 28, and also the wall thicknesses thereof, can also be embodied to be significantly smaller or larger with respect to the respectively corresponding tube piece 14, 16, such that either the first or second attachment element 24, 28 overlaps the respectively corresponding first tube piece 14 or second tube piece 16 over the entire periphery, or vice versa.

Therefore, given an approximately identical cross-sectional diameter, the first tube piece 14 and the first attachment element 24 can be pushed into one another edge to edge, or, given different cross-sectional diameters, they can be pushed into one another with an overlap, and can be welded by the first welded connection 26 (not shown). The same also applies to the second tube piece 16, which is welded to the second attachment element 28 by the second welded connection 30. The welded connections 26, 30 can additionally be matched to the gaps or steps which form between the attachment elements 24, 28 and the tube pieces 14, 16 in any desired configuration in terms of their shape and thickness.

Figure 3:
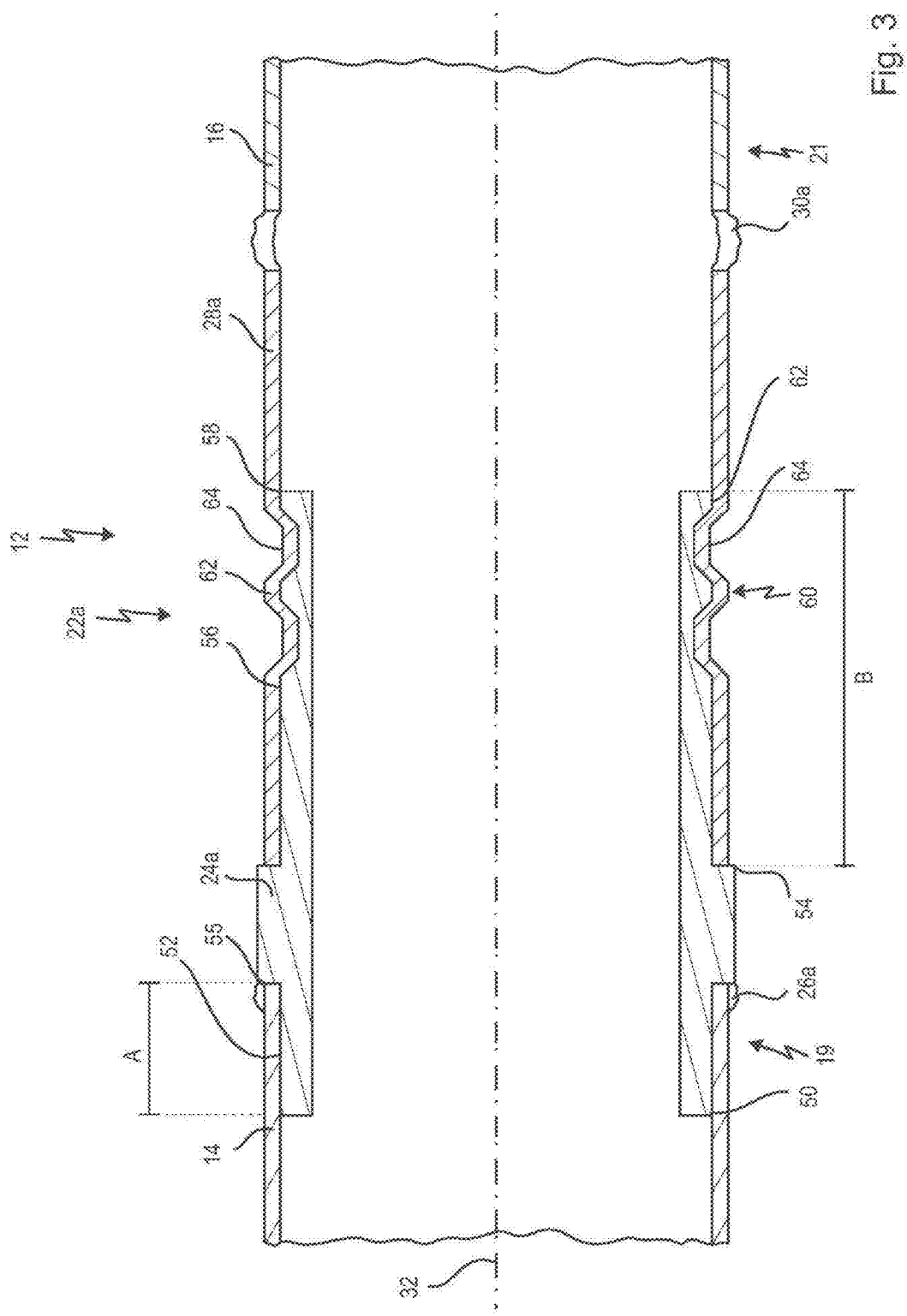
FIG. 3 shows a further exemplary embodiment of a connection arrangement in a sectional illustration similar to that in FIG. 2.

FIG. 3 shows the tube arrangement 12 of the crossmember 10, which has the first tube piece 14 and the second tube piece 16, with a connection arrangement 22a modified with respect to FIGS. 1 and 2.

Parts or elements of the connection arrangement 22a which are identical or comparable to parts or elements of the connection arrangement 22 in FIGS. 1 and 2 are provided with the same reference signs, supplemented by the letter a.

The connection arrangement 22a has a first attachment element 24a, the driver-side end 50 of which is provided with a first overlap region 52, which is formed over the entire periphery and is matched to the profile of the first tube piece 14. In this case, the overlap region 52 has a cross-sectional diameter which is reduced compared to the cross-sectional diameter of the first tube piece 14, such that the first tube piece 14 is received along a partial length A over the entire periphery of the overlap region 52 of the first attachment element 24a. In this case, the overlap region 52 of the first attachment element 24 extends along the partial length A of the first tube piece 14, with an inner peripheral surface of the first tube piece 14 bearing against the entire periphery of an outer peripheral surface of the overlap region 52, and the end 19 of the first tube piece 14 comes to bear against a stop 55 formed over the entire periphery of the first attachment element 24a.

The cross-sectional profile of the stop 55 and the cross-sectional diameter of the stop 55 in this case correspond approximately to the cross-sectional profile and the cross-sectional diameter of the first tube piece 14, such that a substantially stepless transition arises between the first tube piece 14 and the stop 55 of the first attachment element 24a. The first tube piece 14 is additionally connected in material-bonded manner to the first attachment element 24a by a first welded connection 26a in the region of the stop 55.

In addition, the first attachment element 24a has a second overlap region 56, which is arranged at a passenger-side end 58 of the first attachment element 24a. The second overlap region 58 has a rib formation 60, formed over the entire periphery, with elevation regions 62 and depression regions 64. Here, the elevation regions 62 end depression regions 64 have a cross-sectional profile which corresponds to the cross-sectional profile of the second attachment element 28a. The cross-sectional diameter of the elevation regions here corresponds approximately to the internal diameter of the second attachment element 28a, whereas the depression regions have a cross-sectional diameter which is smaller than the cross-sectional diameter of the elevation-regions 62.

The second overlap region 56 is introduced into the second attachment element 28a and extends along a partial length B along the inner peripheral surface of the second attachment element 28a, the second attachment element 28a coming to bear against the step 54.

The second attachment element 28a is connected in material-bonded manner to the second overlap region 56 of the first attachment element 24a. In this case, the second attachment element 28a is pushed into the depression regions 64 over the entire periphery in the region of the rib formation 60, such that the second attachment element 28a is connected to the first attachment element 24a by crimping. Therefore, the first attachment element 24a is connected to the second attachment element 28a fixedly in terms of tensile and compressive loading in the direction of the longitudinal axis 32 and with flexural rigidity transverse to the longitudinal axis 32. It is self-evident that the first attachment element 24a can additionally be joined to the second attachment element 28a in the region of the rib formation 60 in material-bonded manner, in particular by an EMPT welded connection (not shown).

The second attachment element 28a is additionally connected to the passenger-side, second tube piece 16 at the end 21 thereof in a form-fitting manner, in particular by a second welded connection 30a.

In the present exemplary embodiment, the driver-side, first tube piece 14 is produced from steel and the passenger-side, second tube piece 16 is produced from a light metal, in particular aluminum. Therefore, the welded connections 26a, 30a, which connect the first tube piece 14 and the second tube piece 16 to the first attachment element 24a and to the second attachment element 28a of the connection arrangement 22a, form a mono-material or sorted joint.

Figure 4:
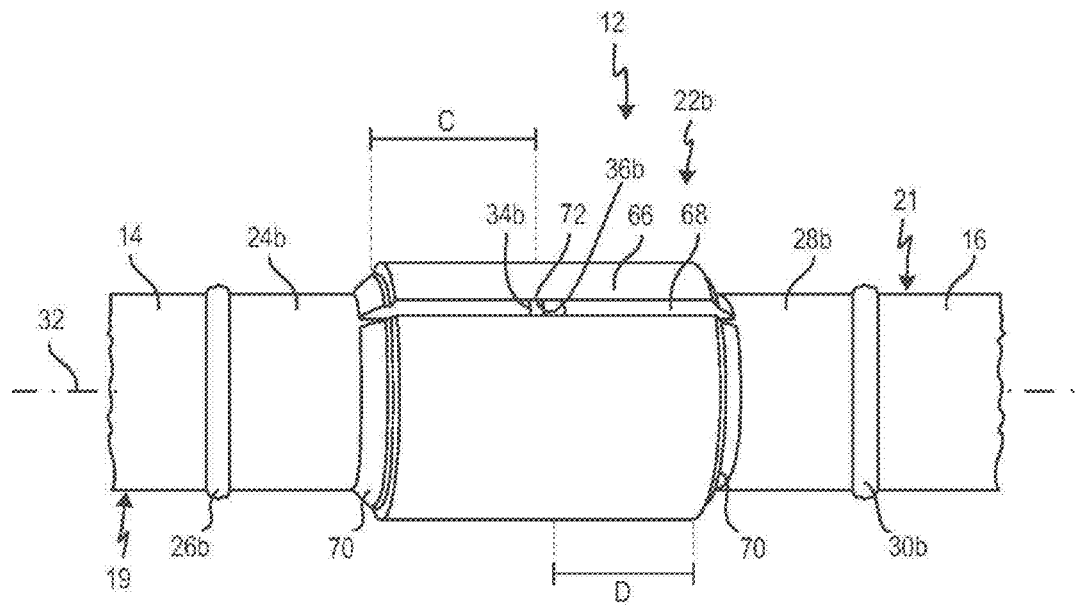
FIG. 4 shows yet another exemplary embodiment of a connection arrangement in a side view.

FIG. 4 is a sectional illustration showing the tube arrangement 12 of the crossmember 10, which has the first tube piece 14 and the second tube piece 16, with a connection arrangement 22b modified with respect to FIGS. 1 to 3.

Parts or elements of the connection arrangement 22b which are identical or comparable to parts or elements of the connection arrangement 22 in FIGS. 1 and 2 are provided with the same reference signs, supplemented by the letter b.

As in the exemplary embodiments described above, the connection arrangement 22b is made up of a first attachment element 24b and a second attachment element 28b, which are connected respectively to the end 19 of the first, driver-side tube piece 14 and the end 21 of the second, passenger-side tube piece 16 by a first welded connection 26b and a second welded connection 30b.

Similarly to in the exemplary embodiments described above, the first attachment element 24b and the first tube piece 14 consist essentially of steel and the second attachment element 28b and the second tube piece 16 consist essentially of light metal, in particular of aluminum. Therefore, the attachment elements 24b, 28b are welded to the tube pieces 14, 16 in a mono-material or sorted manner by the welded connections 20b, 30b.

The first attachment element 24b and the second attachment element 28b and also the first and second tube pieces 14, 16 are arranged in succession along the longitudinal axis 32. The connection arrangement 22b has a sleeve-shaped connection element 66, which surrounds the first attachment element 24b along a partial length C and the second attachment element 28b along a partial length D at least partially peripherally, the cross-sectional profile of the sleeve-shaped connection element 66 being matched substantially to the cross-sectional profile of the first and second attachment elements 24b, 28b, and the sleeve-shaped connection element 66 having a cross-sectional diameter which is enlarged compared to the attachment elements 24b, 28b.

The sleeve-shaped connection element 66 has a partition line 68, by which the cross-sectional diameter of the sleeve-shaped connection element 66 can be matched to the respective tube diameter of the first end second attachment elements 24b, 28b. This can be done, for example, by compressing or widening the connection element 66.

However, it is self-evident that the sleeve-shaped connection element 66 can also have further partition lines, for example in the form of slots, such that the sleeve-shaped connection element 66 is formed in particular as an arrangement of half-shells or partial shells which surround the first and second attachment elements 24b, 28b partially peripherally (not shown).

The first attachment element 24b and the second attachment element 28b are adhesively bonded to the sleeve-shaped connection element 66 by a joining material 70, the joining material 70 being introduced at least partially peripherally into the intermediate spaces between the sleeve-shaped connection element 66 and the attachment elements 24b, 28b.

Therefore, the first attachment element 24b is connected to the second attachment element 28b fixedly in terms of tensile and compressive loading in the direction of the longitudinal axis 32 and with flexural rigidity transverse to the longitudinal axis 32. It is self-evident that the flexural rigidity of the connection arrangement 22b can be increased by enlarging the partial lengths C and D.

The first and second attachment elements 24b, 28b are joined to one another in such a manner that a gap 72 formed over the entire periphery is formed at the opposing end walls 34b, 36b of the first and second attachment elements 24b, 28b.

The gap 72 prevents contact corrosion between the first attachment element 24b and the second attachment element 28b. In addition, owing to the dimension of the gap 72 and the geometrical configuration thereof, a virtually arbitrary tolerance compensation of the first and second attachment elements 24b, 28b can be carried out during assembly of the crossmember 10 in virtually all directions in space.

In the present exemplary embodiment, the connection element 66 consists essentially of a strip of sheet steel bent in a tubular form. However, it is self-evident that the connection element 66 can also be shaped from a light metal sheet, in particular an aluminum sheet. In addition, it is self-evident that the connection element 66 can also consist of a fibre material, in particular of carbon fibre mats or glass fibre mats, which is connected in material-bonded manner by means of the joining material 70 to the first and second attachment elements 24b, 28b, and can surround the latter partially peripherally, but also over the entire periphery, for example formed as a ribbon. In this respect, the fibre material can likewise be connected to the first and second attachment elements 24b, 28b as a prefabricated connection element or directly together with the joining material 70 (not shown).

Figure 5:
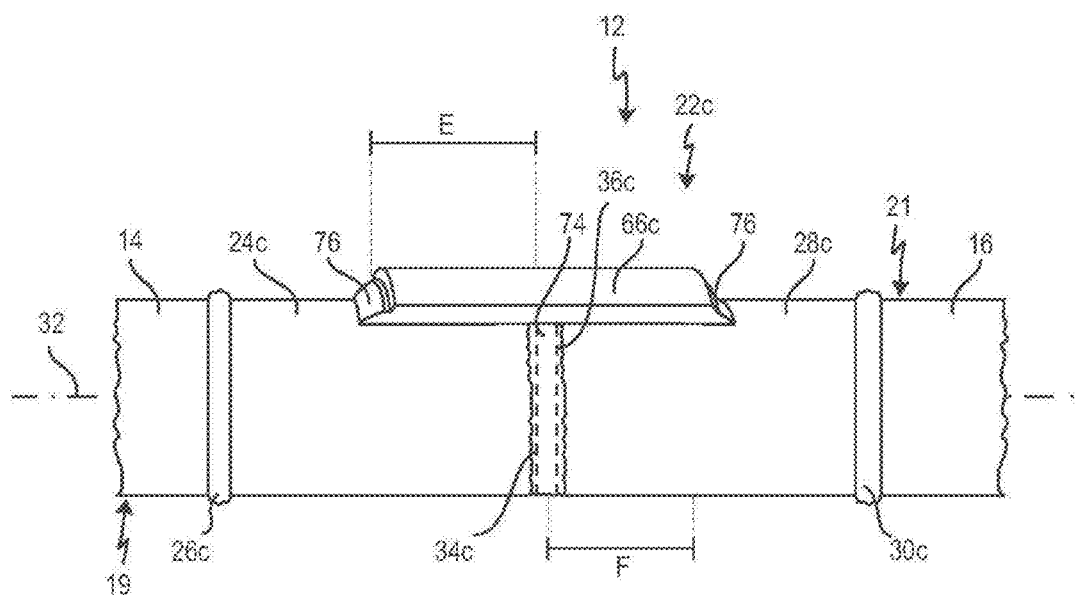
FIG. 5 shows yet another exemplary embodiment of a connection arrangement in a view similar to that in FIG. 4.

FIG. 5 shows the tube arrangement 12 of the crossmember 10, which has the first tube piece and the second tube piece 16, with a further exemplary embodiment of a connection arrangement 22c.

Parts or elements of the connection arrangement 22c which are identical or comparable to parts or elements of the connection arrangement 22 or 22b shown in FIGS. 1, 2 and 4 are provided with the same reference signs, supplemented by the letter c.

The connection arrangement 22c likewise has a first attachment element 24c and a second attachment element 28c. In the present exemplary embodiment, the attachment elements 24c, 28c are likewise connected in material-bonded manner, by a first and second welded connection 26c, 30c, to the first end 19 of the first, driver-side tube piece 14 and the end 21 of the second, passenger-side tube piece 16. The first attachment element 24c and the first tube piece 14 consist of steel and the second attachment element 28c and the second tube piece 16 consist of a light metal, in particular aluminum. Therefore, the attachment elements 24c, 28c are welded to the tube pieces 14, 16 of the crossmember 10 in a mono-material or sorted manner.

The first attachment element 24c is connected in material-bonded manner, in particular by a CMT welded connection 74, to the second attachment element 28c in the region of a first end wall 34c of the first attachment element 24c and of a second end wall 36c lying opposite to the first end wall 34c. Therefore, the first attachment element 26c is connected to the second attachment element 28c solidly in terms of tensile and compressive loading in the direction of the longitudinal axis 32 and with flexural rigidity transverse to the longitudinal axis 32.

The connection arrangement 22c additionally has a sleeve-shaped connection element 66c formed at least partially peripherally along a partial length E of the first attachment element 24c and along a further partial length F of the second attachment element 28c. In this case, the sleeve-shaped connection element 66c consists of a strip of galvanized sheet steel, which is matched to the peripheral profiles of the first and second attachment elements 24c, 28c and is connected to the first attachment element 24c and the second attachment element 28c by further welded connections 76, in particular likewise CMT welded connections. The sleeve-shaped connection element 66c is in this case formed partially peripherally and is welded to the first and second attachment elements 24c, 28c. However, it is self-evident that the sleeve-shaped connection element 66c can also be formed over the entire periphery (not shown).

In addition, it is self-evident that the sleeve-shaped connection element 66c can also be connected to the first and second attachment elements 24c, 28c by adhesive bonding.

In general terms, it is to be noted that the configuration features of the connection arrangement 22 to 22c as described in connection with FIGS. 1 to 5 can be combined with one another as desired. Thus, for example, in a variant of the connection arrangement 22b in FIG. 2, the gap 72 can be closed by a CMT welded connection, such that the first attachment element 24b and the second attachment element 28b can be connected to one another at the first and second end faces 34b, 36b, which increases both the tensile and compressive strength along the longitudinal axis 32 and also the flexural rigidity transverse to the longitudinal axis 32.

It is self-evident that the first and the second tube piece 14, 16 and also the first attachment elements 24 to 24c and the second attachment elements 28 to 28c of the connection arrangements 22 to 22c can fundamentally have any desired cross-sectional diameters and cross-sectional profiles, as long as the cross sections are matched to one another in the region of the welded connections 26 to 26c and also 30 to 30c.

Matched to one another means that the first and second attachment elements 26 to 26c and 28 to 28c can have different cross-sectional diameters compared to the tube pieces 14 and 16, such that the first and second attachment elements 26 to 26c and 28 to 28c are either received one in another in an overlapping manner or are connected to one another edge to edge in the region of the welded connections 26 to 26c and 30 to 30c with the first and second tube pieces 14, 16. The embodiment of the welded connections 26 to 26c and 30 to 30c can also be configured according to the statements made in relation to FIG. 2.

The thickness of the walls of the first and second tube pieces 14, 16 or of the attachment elements 24 to 24c and also 28 to 28c can be matched to the respective intended use, in particular in terms of stability and rigidity of the crossmember 10. The material chosen for the first and second tube pieces 14, 16 and also for the first and second attachment elements 24 to 24c and also 28 to 28c can also include virtually any desired steel alloys and also light metal alloys, as long as it is ensured that the tube pieces 14, 16 can be welded to the respectively corresponding attachment elements 24 to 24c and also 28 to 28c by the welded connections 26 to 26c and also 30 to 30c substantially in a single variety.

What is claimed is:

1. A connection arrangement for connecting two tube pieces of a crossmember for a vehicle, comprising
    a first tube piece having a first material,
    a first attachment element essentially made of the first material and arranged to be solidly connected to the first tube piece in material-bonded manner,
    a second tube piece having a second material different from the first material, a second attachment element essentially made of the second material and fastened to the first attachment element, the second attachment element arranged to be solidly connected to the second tube piece in material-bonded manner;

wherein the first attachment element and the second attachment element are connected to one another through a screw-connector, and further wherein the screw-connector has a screw element and a locking element, wherein the screw element extends in an interior of the first attachment element and of the second attachment element and is held against an inner face of a first end wall of the first attachment element, wherein the locking element is held against a further inner face of a second end wall of the second attachment element lying opposite to the first end wall of the first attachment element, and is screwed to the screw element.

2. The connection arrangement according to claim 1, wherein the first attachment element and the second attachment element are arranged in succession aligned in the longitudinal direction.

3. The connection arrangement according to claim 1, wherein the first attachment element and the second attachment element are tubular.

4. The connection arrangement according to claim 3, wherein the first attachment element and the second attachment element have different wall thicknesses.

5. The connection arrangement according to claim 1, wherein the first attachment element and the second attachment element have different cross sections.

6. The connection arrangement according to claim 1, wherein the first attachment element and the second attachment element are connected to one another in a form-fitting manner.

7. The connection arrangement according to claim 1, further comprising a partition element for avoiding contact corrosion between the first attachment element and the second attachment element, which is arranged between the first attachment element and the second attachment element.

8. The connection arrangement according to claim 1, wherein the first material is chosen from a group consisting of steel, a steel alloy, and the second material is chosen from a group consisting of a light metal, a light metal alloy, aluminum, aluminum alloy.

9. A crossmember for a vehicle, comprising
a first tube piece having a first material,
a first attachment element essentially made of the first material and solidly connected to the first tube piece in material-bonded manner,
a second tube piece having a second material different from the first material,
a second attachment element essentially made of the second material and fastened to the first attachment element, the second attachment element being solidly connected to the second tube piece in material-bonded manner,
wherein the first attachment element and the second attachment element are connected to one another through a screw-connector, and further wherein the screw-connector has a screw element and a locking element, wherein the screw element extends in an interior of the first attachment element and of the second attachment element and is held against an inner face of a first end wall of the first attachment element, wherein the locking element is held against a further inner face of a second end wall of the second attachment element lying opposite to the first end wall of the first attachment element, and is screwed to the screw element, and
wherein the first tube piece and the second tube piece form a crossmember for a vehicle.

10. The crossmember according to claim 9, wherein the first tube piece is connected to the first attachment element and the second tube piece is connected to the second attachment element through at least one of welding and adhesive bonding.

11. The crossmember according to claim 9, wherein the first material is chosen from a group consisting of steel, a steel alloy, and the second material is chosen from a group consisting of a light metal, a light metal alloy, aluminum, aluminum alloy.

* * * * *